US007948403B2

(12) United States Patent
Hartman

(10) Patent No.: US 7,948,403 B2
(45) Date of Patent: May 24, 2011

(54) APPARATUS AND METHOD FOR ALIGNING AN AIRCRAFT

(75) Inventor: Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 272 days.

(21) Appl. No.: 11/950,266

(22) Filed: Dec. 4, 2007

(65) Prior Publication Data

US 2009/0140884 A1 Jun. 4, 2009

(51) Int. Cl.
*B64F 1/18* (2006.01)
*G08G 5/00* (2006.01)

(52) U.S. Cl. ................................ 340/952; 701/4; 701/16

(58) Field of Classification Search .................. 340/952, 340/961; 701/4, 16, 200, 206, 210, 214
See application file for complete search history.

(56) References Cited

U.S. PATENT DOCUMENTS

| | | | | |
|---|---|---|---|---|
| 4,920,488 | A * | 4/1990 | Filley | 705/28 |
| 5,343,395 | A * | 8/1994 | Watts | 701/16 |
| 5,629,691 | A * | 5/1997 | Jain | 340/961 |
| 5,654,890 | A * | 8/1997 | Nicosia et al. | 701/16 |
| 5,666,111 | A | 9/1997 | Servat et al. | |
| 5,689,273 | A | 11/1997 | Bailey et al. | |
| 6,018,698 | A * | 1/2000 | Nicosia et al. | 701/214 |
| 6,112,141 | A * | 8/2000 | Briffe et al. | 701/14 |
| 6,600,992 | B2 * | 7/2003 | Dow | 701/207 |
| 6,606,563 | B2 | 8/2003 | Corcoran, III | |
| 6,614,397 | B2 | 9/2003 | Pullen et al. | |
| 6,850,185 | B1 | 2/2005 | Woodell | |
| 7,337,063 | B1 * | 2/2008 | Oberg et al. | 701/208 |
| 7,428,450 | B1 * | 9/2008 | Oberg | 701/4 |
| 2003/0225487 | A1 * | 12/2003 | Robert et al. | 701/4 |

OTHER PUBLICATIONS

Loss et al., "Autonomous Precision Approach and Landing System (APALS)", "1994 IEEE National Telesystems Conference", 1994, pp. 195-198, Publisher: IEEE.

* cited by examiner

*Primary Examiner* — John A Tweel, Jr.
(74) *Attorney, Agent, or Firm* — Fogg & Powers LLC

(57) ABSTRACT

An apparatus for aligning an aircraft with an area on the ground is provided. The apparatus includes an aircraft having an on-board landing system, the on-board landing system configured to record an image of an area on the ground. The apparatus also includes a location marker on the area of the ground, and a stored image showing at least a portion of the area of the recorded image. The on-board landing system is configured to obtain information from the location marker and use the information to align the recorded image with the stored image.

20 Claims, 3 Drawing Sheets

APPARATUS AND METHOD FOR ALIGNING AN AIRCRAFT

BACKGROUND

Many contemporary aircrafts identify airports, and align with runways, through the use of an image correlation system. One such system which has been proposed for future aircrafts to identify airports and align with runways is the Autonomous Precision Approach and Landing System (APALS). APALS uses the aircraft's radar to "sense" (obtain an image of) the area around an airport. APALS then correlates the observed image with stored images.

Before correlating images, an APALS database is developed by sensing the ground around each airport and storing the sensed images in a database. When APALS is preparing to land at an airport, APALS takes an image of the ground around the aircraft. APALS then loads images from the database and correlates scenes along the approach path to determine the position of the aircraft. The location of the aircraft is determined through system knowledge of the coordinates of stored references in the images, and by determining an angular orientation and offset between the observed image and the expected (stored) image.

APALS and other similar systems, however, are dependent upon accuracy of the correlation process which analyzes the observed scene and the stored scene. This correlation process can create uncertainties, due to the potential confusion in which stored scene to apply. Confusion may occur, for example, because many scenes have similar appearances, which can cause some level of correlation with many scenes. Additionally, the actual scene may have changed since the stored image was taken, due to construction of new buildings, roads, or other landscape modifications. Further, if vehicles or other obstacles are accidentally positioned on a runway, the system may correlate incorrectly resulting in improper alignment and/or a failure to realize the presence of the obstacle. Weather can also make correlation between the observed image and the stored image difficult. For example, blowing sand, debris, or snow can make an observed image appear different than a stored image of the same area.

Other conventional systems rely on Global Positioning System (GPS) coordinates to identify the location of the aircraft. There are certain situations, however, in which GPS may not be reliable and in many cases independent validation is required. For example, ionospheric storms may alter the GPS signal, so as to make the signal non-reliable. To correct errors caused by ionospheric storms, some GPS systems have ground based signal correctors which calculate an error in the GPS signal. Air base GPS systems, however, may not be able to rely on ground based signal corrections, because of signal availability.

Uncertainties and errors are undesirable for aircrafts and aircraft landing systems, as it is imperative that the aircraft identify the correct area and avoid placing the aircraft in danger. For the reasons stated above, and for other reasons stated below which will become apparent to those skilled in the art upon reading and understanding the present specification, there is a need in the art for an apparatus and method for improving the recognition of the desired approach region to be used by an aircraft.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, an apparatus for aligning an aircraft with an area on the ground is provided. The apparatus includes an aircraft having an on-board landing system, the on-board landing system configured to record an image of an area on the ground. The apparatus also includes a location marker on the area of the ground, and a stored image showing at least a portion of the area of the recorded image. The on-board landing system is configured to obtain information from the location marker and use the information to align the recorded image with the stored image.

BRIEF DESCRIPTION OF THE DRAWINGS

The present invention can be more easily understood, and further advantages and uses thereof are more readily apparent, when considered in view of the detailed description and the following figures in which.

In accordance with common practice, the various described features are not drawn to scale but are drawn to emphasize specific features relevant to the present invention.

DETAILED DESCRIPTION

In the following detailed description, reference is made to the accompanying drawings that form a part hereof, and in which is shown by way of illustration specific illustrative embodiments in which the method and system may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide for an apparatus and method for aligning an aircraft with features on the ground. To align the aircraft, a location marker is disposed on an area of ground where the aircraft is to be aligned. A ground correlation system on the aircraft recognizes the location marker and obtains information from the location marker. The information obtained from the location marker is used by a ground correlation system of the aircraft to validate the selected approach and aid in aligning the aircraft with the ground features.

Figure 1:
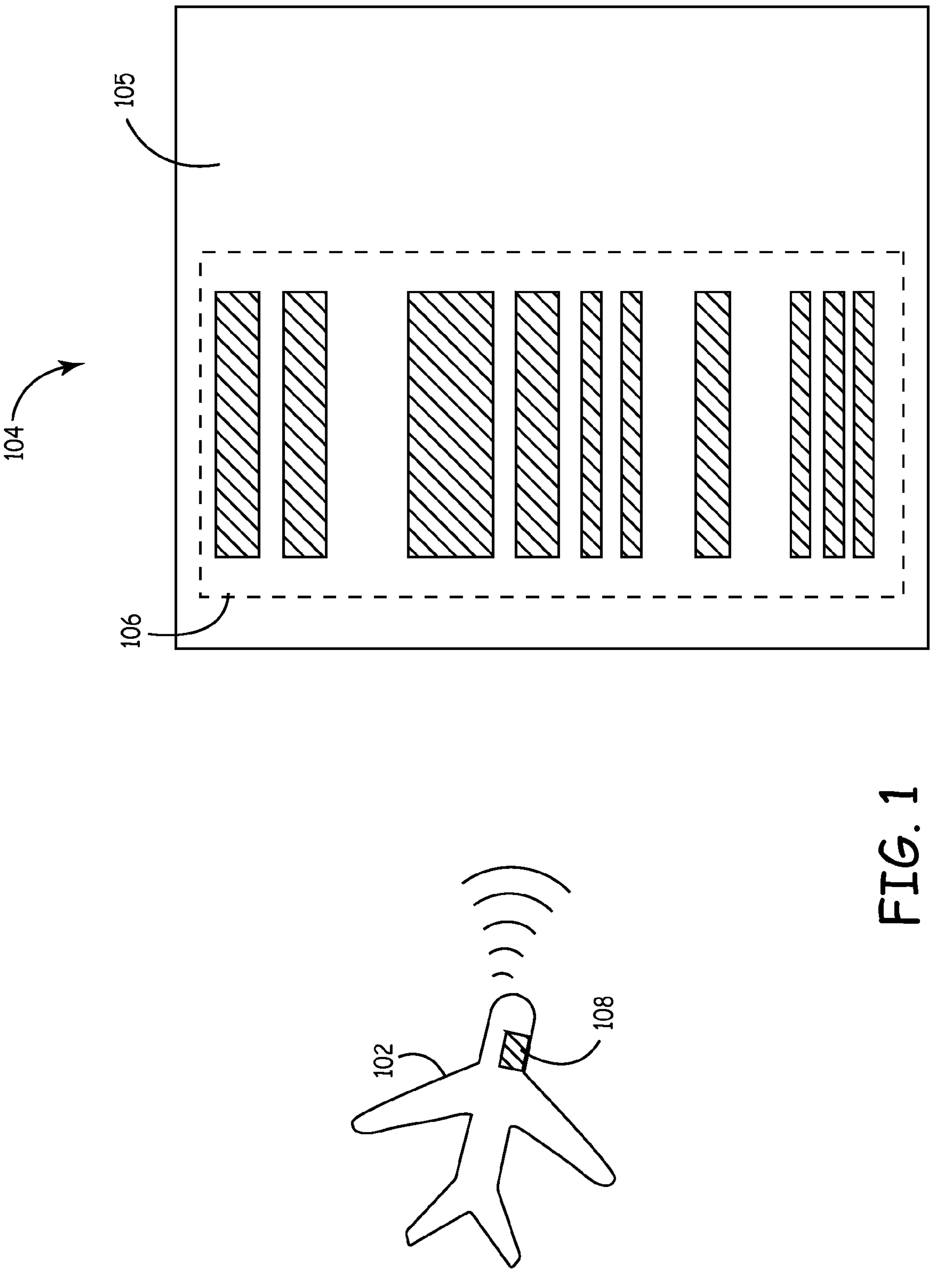
FIG. 1 is a perspective view of one embodiment of a system for aligning an aircraft with ground features.

FIG. 1 illustrates one embodiment of an air alignment system 100. FIG. 1 includes an aircraft 102, an airport 104, and a location marker 106. In this embodiment, aircraft 102 is an airplane. In an alternative embodiment, aircraft 102 is a helicopter. In other embodiments, aircraft 102 is a jet, shuttle, or other flying vehicle. Aircraft 102 includes an on-board system 108 for obtaining images of areas on the ground and processing the images. In one embodiment, on-board system 108 is a radar based system which "senses" the area to obtain an image of the area. In another embodiment, on-board system 108 is an optical vision system such as a camera or a LIDAR which views the area to obtain an image. In yet another embodiment, on-board system 108 is a millimeter wave sensor. In any case, the radar, optical device, or millimeter wave device may be located within on-board system 108, may be part of another system on aircraft 102, or may be located remotely from aircraft 102 as long as the radar, optical device, or millimeter wave device is in communication with on-board system 108.

In one embodiment, marker 106 is a structure which is recognizable by the imaging component of on-board system 108. Marker 106 contains a unique code which relates to the location of marker 106. This unique code is obtained by on-board system 108 and used to determine the location of the area on the ground which is then used by the correlation system to determine the location of the aircraft 102. Marker 106 is one of a plurality of markers used for determining locations. In one embodiment, each airport has a marker used to identify the airport. In another embodiment, each runway at each airport has a marker used to identify the airport and the specific runway at the airport. In yet another embodiment, each end of each runway at each airport has a marker used to identify, the heading towards the runway as well as which runway and airport. The code obtained from each marker is unique from all other markers. Thus, the code obtained can be used to determine from which marker of the plurality of markers the code was obtained and validate that the desired landing site is being approached.

In one embodiment, as aircraft 102 is flying, aircraft 102 observes an area over which aircraft 102 is located to obtain an image of the area. On-board system 108 analyzes the image to determine if marker 106 is located therein. If marker 106 is located within the recorded image, on-board system 108 recognizes marker 106 and obtains a unique code from marker 106. On-board system 108 uses the unique code obtained from marker 106 to determine a location for aircraft 102. In one embodiment, on-board system 108 contains a database of unique codes relating to a plurality of markers. The database relates each unique code to a location. Thus, when on-board system 108 obtains the unique code from marker 106, on-board system 108 compares the unique code to the database and ascertains the location of aircraft 102. In another embodiment, the unique code obtained is a geographic coordinate system point of marker 106, such as latitude, longitude, and altitude which is used directly to determine a location of aircraft 102.

In another embodiment, on-board system 108 identifies areas based on a correlation between an observed image of an area and a stored image of the area. In this embodiment, aircraft 102 uses on-board system 108 to align the aircraft with a runway of airport 104 when landing aircraft 102. As is known to those skilled in the art, the observed image and the stored image, need not be of precisely the same area. Correlation can be achieved when only portions of each image are of the same area. Marker 106 is used by on-board system 108 to aid the image correlation of on-board system 108 when aligning aircraft 102 with a runway 105.

In one embodiment, marker 106 is a bar code which can be read by on-board system 108 to obtain a unique code. In the embodiment shown in FIG. 1, marker 106 is positioned on runway 105 of airport 104. Each of the strips of bar code marker 106 is composed of a material which can be “seen” by on-board system 108. For example, in one embodiment, on-board system 108 is an optical synthetic vision system and bar code marker 106 is a plurality of white painted strips on a black pavement runway. In an alternative embodiment, on-board system 108 is a radar based system and bar code marker 106 is a plurality of strips of radar reflective material. The bar code marker 106 conveys a unique code to a reader through variation in the width, height, number, and space between strips of bar code marker.

In operation, on-board system 108 observes an optical image of airport 104. On-board system 108 then analyzes the image to determine if a location marker is located therein. In one embodiment, to determine if a location marker is present in the optical image, on-board system 108 examines the image and determines a probable match for the image via correlation with stored images. When on-board system 108 finds a match for the image, on-board system 108 determines if a marker is located within or nearby the matched image. On-board system 108 then uses the marker location as known in the stored image and looks to that portion of the observed image to ascertain if the marker is there. If on-board system 108 locates marker 106 within the observed image, on-board system 108 obtains the unique code from marker 106 to verify that on-board system 108 is correlating with the correct image. If on-board system 108 determines marker 106 is out of the scope of the viewed image, a new image may be taken and the unique code may then be obtained from marker 106. On-board system 108 then uses the code from marker 106 to verify that the matched image is in the correct area.

In an alternative embodiment, to determine if an airport marker is present in the observed image, on-board system 108 scans the observed image looking for a marker. If bar code marker 106 is located in the observed image, on-board system 108 reads the unique code from marker 106. On-board system 108 then matches the unique code to one or more stored images of the area associated with the unique code. On-board system 108 loads one or more images from the area associated with the unique code of marker 106 and correlates the one or more stored images with the observed image to align aircraft 102. In this way, aircraft 102 has verified that on-board system 108 is correlating with stored images of the correct area, because each of the one or more images which are associated with the unique code are possible matches for the observed image.

In one embodiment, the data obtained from marker 106 is a unique set of numerals and/or letters. Here, on-board system 108 contains a database which associates the unique set of numerals/letters to one or more of the stored images. In an alternative embodiment, the code obtained from marker 106 is a geographic coordinate system point of marker 106, such as latitude, longitude, and altitude. Here, on-board system 108 uses the coordinates to directly align marker 106 with the known location of marker 106 in the stored image, or uses the coordinates to determine one or more images that are in the area of (associated with) the coordinates.

In one embodiment, a plurality of location markers is used to align aircraft 102. Here, two or more location markers can be used without image correlation and a line can be determined. The line can then be used to align aircraft 102. Alternatively, additional location markers can be used as additional verification that the alignment and/or stored image used by on-board system 108 is correct. Finally, although marker 106 is described above as a bar code, in other embodiments, marker 106 is made up of unique shapes, letters, and/or numbers which are used to convey information to on-board system 108.

Figure 2:
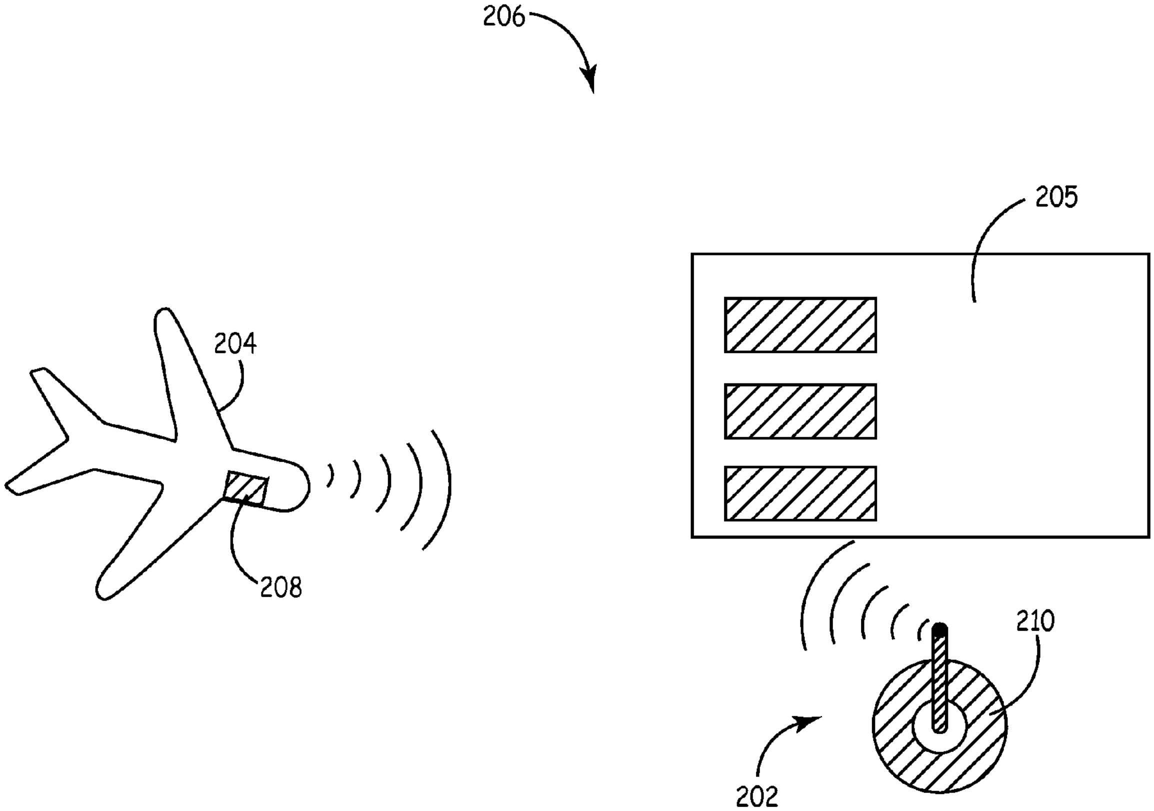
FIG. 2 is a perspective view of one embodiment of another system for aligning an aircraft with ground features.

FIG. 2 illustrates another embodiment of a location marker 202. Similar to FIG. 1, FIG. 2 includes an aircraft 204 with an on-board system 208, and an airport 206. Similar to marker 106, marker 202 is constructed such that marker 202 is recognizable by on-board system 208. Here, aircraft 204 is a helicopter and airport 206 is a heliport. In an alternative embodiment, aircraft 204 is an airplane. In other embodiments, aircraft 204 is a jet, shuttle, or other flying vehicle. Marker 202 is a radio frequency identification (RFID) marker. As a RFID marker, marker 202 transmits a radio signal containing information regarding the location of marker 202. Marker 202 transmits the radio signal in response to a received signal requesting information from marker 202. In one embodiment, marker 202 includes a ring of a radar reflective material 210. To determine if a marker 202 is present in the image, on-board system 208 scans the image looking for a marker. If marker 202 is located in an image, on-board system 208 notes the location of marker 202 and requests information from marker 202.

In one embodiment, as aircraft 204 is flying, on-board system 208 observes an area over which aircraft 204 is located to obtain an image of the area. On-board system 208 analyzes the image to determine if marker 202 is located therein. If marker 202 is located within the observed image, on-board system 208 recognizes marker 202 and obtains a unique code from marker 202. On-board system 208 uses the unique code obtained from marker 202 to determine a location for aircraft 204. In one embodiment, on-board system 208 contains a database of unique codes relating to a plurality of markers. The database relates each unique code to a location. Thus, when on-board system 208 obtains the unique code from marker 202, on-board system 208 compares the unique code to the database and ascertains the location of aircraft 204. In another embodiment, the unique code obtained is a geographic coordinate system point of marker 202, such as latitude, longitude, and altitude which is used directly to determine a location of aircraft 204.

In another embodiment, on-board system 208 identifies areas based on a correlation between an observed image of an area and a stored image of the area. In this embodiment, aircraft 204 uses on-board system 208 to align the aircraft with a runaway of airport 206 when landing aircraft 204. As is known to those skilled in the art, the observed image and the stored image, need not be of precisely the same area. Correlation can be achieved when only portions of each image are of the same area. Marker 202 is used by on-board system 208 to aid the image correlation of on-board system 208 when aligning aircraft 204 with a runway 205.

In operation, on-board system 208 observes a radar image of airport 206. On-board system 208 then analyzes the image to determine if a location marker is located therein. In one embodiment, to determine if a location marker is present in the radar image, on-board system 208 examines the image and determines a probable match for the image via correlation with stored images. When on-board system 208 finds a match for the image, on-board system 208 determines if a marker is located within or nearby the matched image. On-board system 208 then uses the marker location as known in the stored image and looks to that portion of the observed image to ascertain if the marker is there. If on-board system 208 locates marker 202 within the observed image, on-board system 208 obtains the unique code from marker 202 to verify that on-board system 208 is correlating with the correct image. If on-board system 208 determines marker 202 is out of the scope of the viewed image, a new image may be taken and the unique code may then be obtained from marker 202. On-board system 208 then uses the code from marker 202 to verify that the matched image is in the correct area.

In an alternative embodiment, to determine a location for aircraft 204, on-board system 208 transmits a signal requesting information from marker 202. Marker 202 receives the signal requesting information and transmits a return signal with the information contained in RFID marker 202. On-board system 208 receives the return signal from marker 202 and extracts the information from the signal. On-board system 208 reads the information to obtain the identification of marker 202. Then, if on-board system 208 wishes to align aircraft 204 with the area, on-board system 208 loads images for the area associated with marker 202 and correlates the observed image with the stored images associated with marker 202.

In one embodiment, the data obtained from marker 202 is a unique set of numerals. Here, on-board system 208 contains a database which associates the unique code to one or more of the stored images. In an alternative embodiment, the code obtained from marker 202 is a geographic coordinate system point of marker 202, such as latitude, longitude, and altitude. Here, on-board system 208 uses the coordinates to directly align marker 202 with the known location of marker 202 in the stored image, or uses the coordinates to determine one or more images that are in the area of (associated with) the coordinates.

In one embodiment, a plurality of location markers is used to align aircraft 204. Here, two or more location markers can be used without image correlation and a line can be determined. The line can then be used to align aircraft 204. Alternatively, additional location markers can be used as additional verification that the alignment and/or stored image used by on-board system 208 is correct.

In one embodiment, marker 202 is used as a verification for a Global Position System (GPS). Here, aircraft 204 uses GPS to identify its location. As noted in the background, however, GPS may require independent validation. Therefore, to verify that the location given by the GPS is correct, on-board system 208 reads the location from marker 202 and compares the location obtained from marker 202 to the location given by the GPS for marker 202. If the location given by the GPS is the same as the location obtained from marker 202, aircraft 204 maintains the use of the GPS as a navigation aid. If the location given by the GPS is different from, or outside of a desired tolerance of, the location obtained from marker 202, the GPS is deemed to be in error, and a navigation aid other than the GPS is used by aircraft 204.

Figure 3:
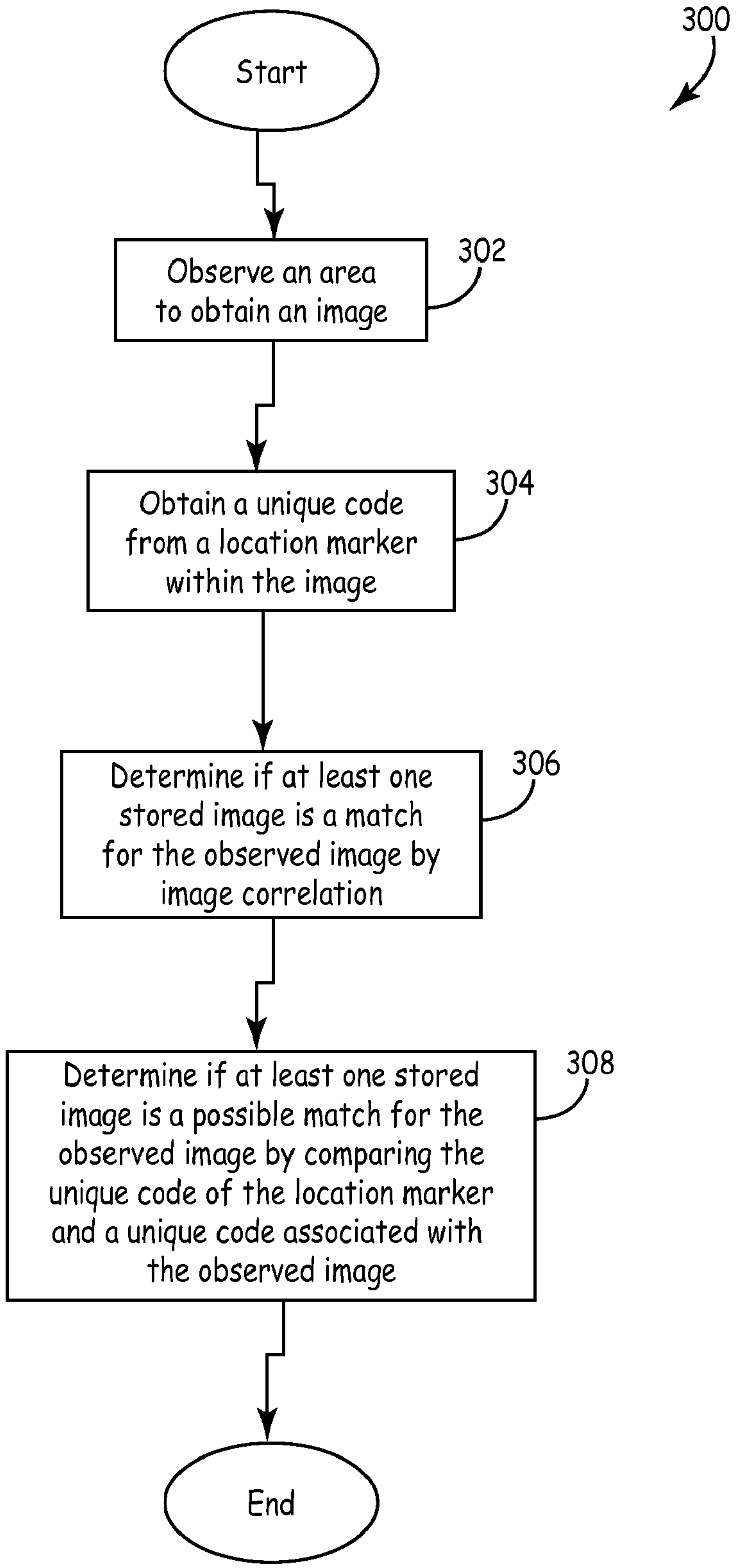
FIG. 3 is a flow chart of one embodiment of a method of aligning an aircraft with ground features.

Referring now to FIG. 3, one embodiment of a method 300 of aligning an aircraft is shown. Beginning at block 302, an aircraft observes an area to obtain an image of the area with which the aircraft is attempting to align. An on-board landing system determines whether a location marker is present in the image observed by the on-board landing system. If a location marker is present, the aircraft obtains a unique code from the location marker (304). In one embodiment, the location marker is a bar code. In another embodiment, the location marker is an RFID device. At block 306, the landing system uses image correlation to compare the observed image to a stored image to determine whether the observed image is a match for the observed image. The landing system also determines if at least one stored image is a possible match for the observed image by comparing the unique code obtained from the location marker to a unique code associated with the image (308). In one embodiment, the unique code is used to select the stored image which is used to determine a match through image correlation. In another embodiment, the unique code is used to verify the match determined by the image correlation is a possible match.

Although specific embodiments have been illustrated and described herein, it will be appreciated by those of ordinary skill in the art that any arrangement, which is calculated to achieve the same purpose, may be substituted for the specific embodiments shown. This application is intended to base any adaptations or variations of the present invention. Therefore, it is manifestly intended that this invention be limited only by the claims and the equivalents thereof.

What is claimed is:

1. An apparatus for determining a location for an aircraft relative to an area on the ground, the apparatus comprising:

an on-board landing system on an aircraft, the on-board landing system configured to identify a location marker on an area of the ground, the location marker configured to reflect a signal from the aircraft back to the aircraft as a reflected signal, wherein the reflected signal contains a unique, reflective code from the location marker and carries the code to the on-board landing system;

wherein the on-board landing system is configured to obtain the unique, reflective code from the reflected signal and use the unique, reflective code to determine a location of the aircraft.

2. The apparatus of claim 1, further comprising:

a memory coupled to the on-board landing system, the memory configured to store a plurality of images of areas on the ground;

wherein the on-board landing system is configured to observe an area of the ground to obtain an image of the area, and determine at least one match for the observed image from the plurality of stored images;

wherein the unique, reflective code obtained from the location marker is used to determine if at least one of the plurality of stored images is a possible match for the observed image.

3. The apparatus of claim 2, wherein the unique, reflective code obtained from the location marker is used to select at least one image of the plurality of images which is used to determine at least one match.

4. The apparatus of claim 2, wherein the unique, reflective code obtained from the location marker is used to verify that the at least one match is in the same area as the observed image.

5. The apparatus of claim 1, wherein the on-board landing system is configured to observe the ground with one of a radar, a LIDAR, or a millimeter wave sensor.

6. The apparatus of claim 1, wherein the location marker is a bar code which is located on a runway of an airport.

7. The apparatus of claim 1, wherein the location marker is a radio frequency identification device (RFID).

8. The apparatus of claim 1, wherein the on-board landing system is configured to recognize the location marker in the observed image and use the location of the location marker in the observed image to orient the aircraft.

9. A method for determining a location for an aircraft, the apparatus comprising:

observing an area with a landing system on-board an aircraft to obtain an image of the area;

transmitting a signal from the aircraft;

receiving a reflected signal at the aircraft, wherein a location marker reflects the signal from the aircraft as the reflected signal and wherein the reflected signal contains a unique, reflective code;

obtaining the unique, reflective code from the location marker within the area of the observed image, the code uniquely identifying the location marker;

determining a location of the aircraft based on the unique, reflective code.

10. The method of claim 9, wherein determining a location for the aircraft further comprises:

determining if a stored image is a match for the observed image by image correlation; and determining if at least one stored image is a possible match of the observed image by comparing the unique, reflective code of the marker to a unique code associated with the at least one stored image.

11. The method of claim 10, wherein determining if at least one stored image is a possible match further comprises selecting at least one stored image for use in determining if at least one stored image is a match by image correlation.

12. The method of claim 10, wherein determining if at least one stored image is a possible match further comprises verifying that a match determined by image correlation is a possible match.

13. The method of claim 9, wherein observing an area further comprises sensing the area with an optical vision system.

14. The method of claim 9, wherein observing an area further comprises sensing the area with a radar.

15. The method of claim 9, wherein the location marker is a bar code and obtaining a unique code further comprises reading the bar code and using the code to select an area to execute a correlation function.

16. The method of claim 9, wherein the location marker is a radio frequency identification (RFID) device and obtaining a unique, reflective code further comprises receiving a reflective signal from the RFID device.

17. An system for aligning an aircraft, the system comprising:

an airport; and a location marker located near the airport and configured to aid in landing an aircraft, the location marker configured to be recognizable by an on-board landing system of the aircraft, the location marker configured to convey a unique, reflective code to the on-board landing system for use by the on-board landing system in identifying a location for the aircraft, wherein the unique reflective code is conveyed to the aircraft by reflecting a signal from the aircraft, the reflected signal containing the unique, reflective code.

18. The apparatus of claim 17, wherein the location marker is configured to be recognizable by a radar which is in communication with the on-board landing system.

19. The apparatus of claim 18, wherein the location marker is a bar code.

20. The apparatus of claim 17, wherein the unique, reflective code includes coordinates of latitude and longitude.

* * * * *